United States Patent

Yamamoto et al.

[11] Patent Number: 5,926,329
[45] Date of Patent: Jul. 20, 1999

[54] REFLECTION MIRROR FOR VEHICLE LAMP AND METHOD OF FORMING THE SAME

[75] Inventors: Norimasa Yamamoto; Masahiro Maeda; Takashi Sone, all of Shizuoka, Japan

[73] Assignee: Koito Manufacturing Co., Ltd., Tokyo, Japan

[21] Appl. No.: 08/733,639

[22] Filed: Oct. 17, 1996

[30] Foreign Application Priority Data

Oct. 18, 1995 [JP] Japan .................................. 7-293768

[51] Int. Cl.⁶ .............................. G02B 5/10; F21V 7/06; B60Q 1/04
[52] U.S. Cl. ......................... 359/869; 359/853; 362/518; 362/544; 362/297; 362/346
[58] Field of Search ...................... 359/851, 853, 359/868, 869; 362/518, 544, 297, 304, 305, 346

[56] References Cited

U.S. PATENT DOCUMENTS

| | | |
|---|---|---|
| 1,591,190 | 7/1926 | Stair . |
| 1,737,027 | 11/1929 | Schoonmaker . |
| 3,401,258 | 9/1968 | Guth . |
| 4,555,748 | 11/1985 | Bradley . |
| 4,704,661 | 11/1987 | Kosmatka ............................... 362/518 |
| 4,772,988 | 9/1988 | Brun ........................................ 362/518 |
| 4,779,077 | 10/1988 | Lichtblau . |
| 4,794,504 | 12/1988 | Creff . |
| 4,799,131 | 1/1989 | Aho et al. . |
| 4,916,585 | 4/1990 | Nino ........................................ 362/518 |
| 5,192,124 | 3/1993 | Kawashima et al. ................... 362/297 |
| 5,532,909 | 7/1996 | Ban et al. . |
| 5,655,828 | 8/1997 | Yamamoto et al. .................... 362/346 |
| 5,707,141 | 1/1998 | Yamamoto et al. .................... 362/346 |
| 5,727,874 | 3/1998 | Yamamoto et al. .................... 362/346 |
| 5,777,809 | 7/1998 | Yamamoto et al. .................... 359/869 |
| 5,779,340 | 7/1998 | Maeda ..................................... 362/346 |

*Primary Examiner*—Ricky D. Shafer
*Attorney, Agent, or Firm*—Sughrue, Mion, Zinn, Macpeak & Seas, PLLC

[57] ABSTRACT

A reflection mirror includes a main reflection portion including a region close to a main optical axis of the reflection mirror, and circumferential wall portions surrounding the main reflection portion. An inner surface of the circumferential wall portions of the reflection mirror is formed into an inclined surface with respect to the main optical axis of the reflection mirror, and such an inclined surface is made to be smoothly continuous to an inner surface of the main reflection portion to thereby form a fundamental surface of a reflection surface. Then, a group of paraboloids of revolution consisting of many paraboloids of revolution whose focal distances are different from one another is prepared. Then, intersecting lines between the fundamental subrace of the reflection surface and the group of paraboloids of revolution are obtained. Further, many reflection steps are formed on the main reflection portion and the circumferential wall portion. The reflection steps are defined by portions of the respective paraboloids of revolution constituting the group of paraboloids of revolution and are disposed between adjacent ones of the intersecting lines.

13 Claims, 7 Drawing Sheets

REFLECTION MIRROR FOR VEHICLE LAMP AND METHOD OF FORMING THE SAME

BACKGROUND OF THE INVENTION

The invention relates to a reflection mirror for an vehicle lamp that allows rays of reflecting light to be utilized as controlled rays of light for formation of luminous intensity distribution, the rays of reflecting light being reflected at an inner surface of a circumferential wall portion arranged around a main reflection portion that includes a region close to an intersecting point between a main optical axis of the reflection mirror and the reflection mirror.

A vehicle lamp basically includes: a lamp body having an opening at one end thereof; a reflection mirror arranged within the lamp body or a reflection portion formed by subjecting a part of the lamp body to a reflection treatment; and an outer lens that covers the opening of the lamp body. The reflection surface of the reflection mirror or the reflection portion is formed into, e.g., a paraboloid of revolution that is symmetric about the optical axis of the lamp.

Lamps whose front is circular or square are known. In this case, the circumferential wall portion that surrounds a main reflection portion including a region close to an intersecting point between the main optical axis of the reflection mirror or the reflection portion and the reflection mirror or the reflection portion, is formed to be flat. Therefore, rays of light reflected at the circumferential wall portion out of rays of light emitted from a light source located between the outer lens and the reflection mirror or the reflection portion within the lamp become ineffective for luminous intensity distribution, which in turn hampers improvement in efficiently utilizing luminous fluxes.

In order to overcome this problem, various types of lamps have been developed, such lamps being characterized by forming irregular reflection surfaces or the like on the circumferential wall portion. For example, U.S. Pat. No. 4,979,077, U.S. Pat. No. 4,794,504, and the like disclose such lamps.

The reflection mirror for the aforementioned lamps utilizes rays of irregularly reflected light or diffused light at the circumferential wall portion. These rays of light are, in the end, not rays of reflecting light that are so well controlled as to be oriented toward a predetermined direction. As a result, there is a limitation in utilizing such rays of light as effective rays of light for luminous intensity distribution for the lamp.

To overcome this problem, it is conceivable either to reduce the area of the inner surface of the circumferential wall portion by forming the reflection surface of the reflection mirror or the reflection portion of a plurality of regions, e.g., a combination of paraboloids of revolution whose focal distances are different from one another, or to control rays of light heading toward the circumferential wall portion from a light source by interposing an inner lens between the outer lens of the lamp and the reflection mirror or the reflection portion. However, a significant uneven portion may be formed at the borders between the surfaces constituting the reflection surface in the former case, whereas the inner lens increases the cost of manufacture in the latter case.

SUMMARY OF THE INVENTION

An object of the invention is to allow rays of light reflected at a circumferential wall portion of a reflection mirror or a reflection portion to be utilized as effective rays of light for luminous intensity distribution only by designing the shape of the reflection surface appropriately so that an optically controlling lens member is not interposed between the outer lens and the reflection mirror or the reflection portion, and further a significant uneven portion is not formed between the surfaces constituting the reflection surface.

To achieve the above object, the invention is applied to a reflection mirror for a vehicle lamp having a main reflection portion and upper and lower and/or left and right circumferential wall portions, the main reflection portion including a region close to an intersecting point between a main optical axis of the reflection mirror and the reflection mirror, and the upper and lower and/or left and right circumferential wall portions surrounding the main reflection portion. In such a reflection mirror, an inner surface of the circumferential wall portions is inclined with respect to the main optical axis and the inner surface is made smoothly continuous to an inner surface of the main reflection portion to form a fundamental surface of a reflection surface, and many reflection steps are formed on the inner surface of the main reflection portion and of the circumferential wall portions, the reflection steps being defined by portions of respective paraboloids of revolution and disposed between adjacent ones of closed curves formed as intersecting lines between a group of the paraboloids of revolution with different focal distances and the fundamental surface of the reflection surface or disposed between adjacent ones of curves which are parts of the closed curves.

According to the invention, many reflection steps are formed on the inner surface of the main reflection portion and the circumferential wall portions. These reflection steps formed on the inner surface of the circumferential wall portions provide rays of light whose reflecting direction is controlled, so that such rays of light can be utilized as effective rays of light for luminous intensity distribution. In addition, it is not required that the fundamental surface of the reflection mirror is divided into a plurality of reflection regions whose luminous intensity distributing characteristics are different from one another. Therefore, there is no significant uneven portion formed on the borders between the divided regions, and no inner lens must be interposed between the reflection mirror and the outer lens.

BRIEF DESCRIPTION OF THE DRAWINGS

FIG. 3 is a sectional view schematically showing the shape of circumferential wall portions.

FIG. 8 is a front view showing part of a lamp in partially cutaway form.

DETAILED DESCRIPTION OF THE INVENTION

A reflection mirror for a vehicle lamp and a method of forming such reflection mirror will now be described.

Figure 1:
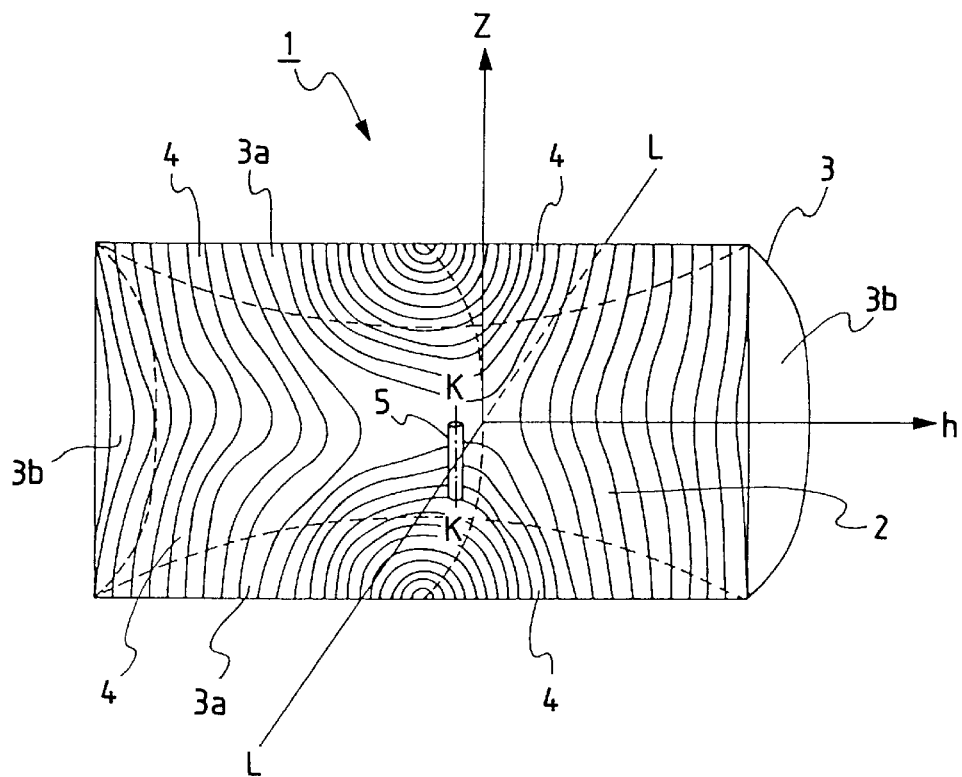
FIG. 1 is a perspective view schematically showing a configuration of a reflection mirror for an vehicle lamp of the invention.

As schematically shown in FIG. 1, a reflection mirror 1 for a vehicle lamp has an opening on one end thereof and is boxlike with the shape of the front thereof being rectangular. The reflection mirror 1 includes: a main reflection portion 2 including a region close to an intersecting point between the main optical axis (hereinafter referred to as "L-L") of the reflection mirror 1 and the reflection mirror 1; and a circumferential wall portion 3 surrounding all the main reflection portion 2, i.e., upper and lower circumferential wall portions 3a, 3a and left and right circumferential wall portions 3b, 3b.

Figure 2:
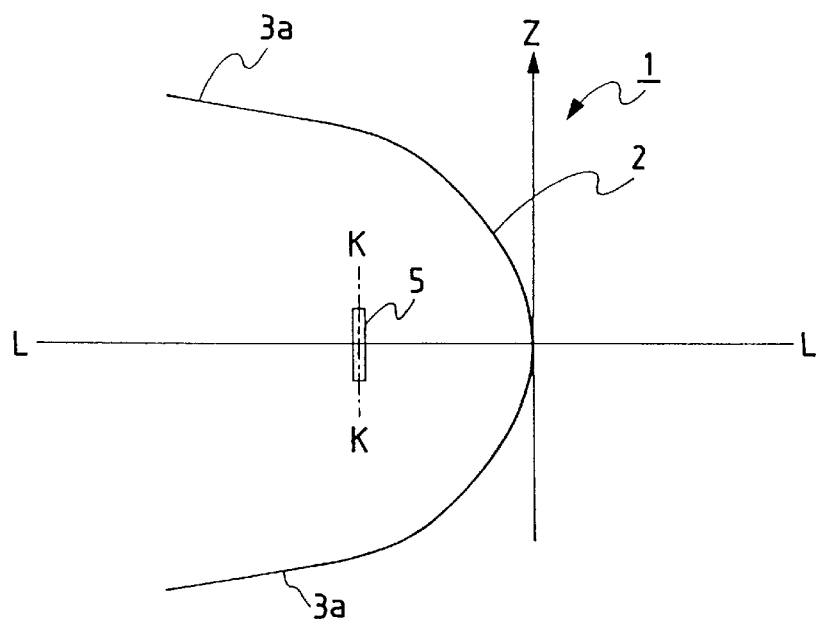
FIG. 2 is a sectional view schematically showing the reflection mirror for the vehicle lamp of the invention.

The reflection surface of the main reflection portion 2 is basically designed to be a free curved surface (curved surface that cannot be expressed analytically or is hard to be expressed analytically). Further, as schematically shown in cross-sectional form in FIG. 2, the circumferential wall portions 3a, 3a are formed into either flat or curved surfaces that are mildly inclined so that the distance between the circumferential wall portions 3a, 3a gradually widens vertically toward the front (the front being in the direction of light irradiation from the reflection mirror 1). Such circumferential wall portions 3a, 3a are connected to the reflection surface of the main reflection portion 2 at the rear end portions thereof. It may be noted that the reflection surface of the reflection mirror 1 is constructed of a member that is independent of the lamp body or formed by subjecting the inner surface of the lamp body to a reflection treatment.

Further, the circumferential wall portions 3b, 3b are formed into either flat surfaces that are parallel with each other or flat or curved surfaces that are mildly inclined so that the distance between the circumferential wall portions 3b, 3b gradually widens horizontally toward the front. Such circumferential wall portions 3b, 3b are also connected to the reflection surface of the main reflection portion 2 at the rear end portions thereof.

On the reflection surface of the reflection mirror 1, i.e., on the inner surface of the main reflection portion 2 and the circumferential wall portion 3, a great number of reflection steps 4, 4, . . . are formed. The reflection steps 4, 4, . . . are formed so as to be divided by borderlines that are either looplike or part of loops. These reflection steps 4, 4, . . . so are only slightly projected frontward, and the distances between the adjacent reflection steps are different from one position to another over the reflection surface. It may be noted that the center of the looplike borderlines dividing the reflection steps 4 does not necessarily coincide with the intersecting point between the main optical axis L-L of the reflection mirror 1 and the main reflection portion 2 (for example, the center of the loops may be on the circumferential wall portion 3).

A light source body 5 (such as a filament of an electric bulb and an arc of a discharge lamp) is disposed slightly ahead of the reflection mirror 1 on the L-L axis within the reflection mirror 1 through a not shown light source insertion hole. While a reference axis (denoted as "K-K") of the light source body 5 extends in the vertical direction (indicated by a vertical axis z in FIG. 1) so as to be orthogonal to the main optical axis L-L in FIG. 2, the light source body 5 can be arranged so that the reference axis K-K thereof extends in a horizontal direction (as indicated by a horizontal axis h in FIG. 1) so as to be orthogonal to the main optical axis L-L, or the light source body 5 can be arranged so that the reference axis K-K thereof extends in parallel with the main optical axis L-L.

FIGS. 3 to 7 show a method of forming the reflection surface of the reflection mirror 1.

Figure 5:
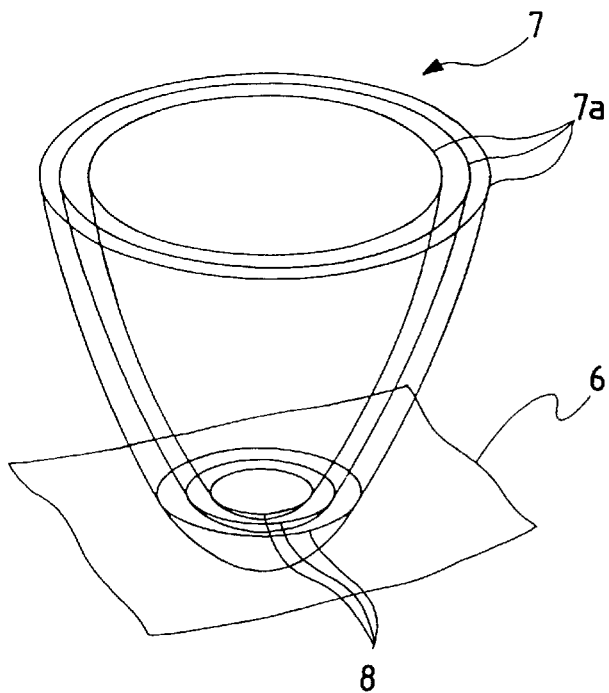
FIG. 5 is a diagram showing a group of paraboloids of revolution and a fundamental surface of the reflection surface, as well as formation of a group of closed curves obtained as intersecting lines between the group of paraboloids of revolution and the fundamental surface.

First, as shown in FIG. 5, a curved surface 6 that defines the basic shape of the reflection surface must be determined. Since the reflection mirror 1 is constructed of the main reflection portion 2 and the circumferential wall portion 3 as described above, how these inner surfaces are basically shaped must be considered.

The inner surface of the main reflection portion 2 is designed by means of CAD (Computer Aided Design) as a free curved surface, taking the shape of a vehicle body into consideration. The reason therefor is that it is the main reflection portion 2 that determines the depth of the lamp and that affects interference between the lamp and the vehicle body.

Further, the effective area on the reflection surface is enlarged by inclining the circumferential wall portions 3a, 3b in such a manner that the widths of the circumferential wall portions 3a, 3b increase toward the front. That is, as shown by the solid lines in FIG. 3, if circumferential wall portions 3a', 3a' are flat surfaces that are parallel with respect to the main optical axis L-L, an area equivalent to a solid angle $\omega a$ is optically controllable. That is, when it is assumed that a point light source is placed on a reference point F through the main optical axis L-L, the reflection surface of the main reflection portion 2 defined with respect to the point F corresponds to the solid angle $\omega a$. However, as shown by the arrows A, A in FIG. 3, flat surfaces or curved surfaces inclined with respect to the main optical axis L-L, can be formed by gradually widening the distance between the circumferential wall portions 3a, 3a toward the front as shown by one-dot chain lines in FIG. 3. By using these surfaces as such inner surfaces of the circumferential wall portions 3a, 3a, a solid angle $\omega b$ that corresponds to the reflection surface of the main reflection portion 2 and of the circumferential wall portions 3a, 3a defined with respect to the point F becomes larger than the solid angle $\omega a$. As a result, an optically controllable area can be increased. It may be noted that it is preferred that the main reflection portion 2 and the circumferential wall portions 3a be connected as smoothly as possible along their borders. That is, it is generally desirable that both surfaces are connected in the form of an nth order continuum (i.e., continuum and regularity is established on a connecting point with a derivative of the nth order present), where $n \geq 1$.

Figure 3:
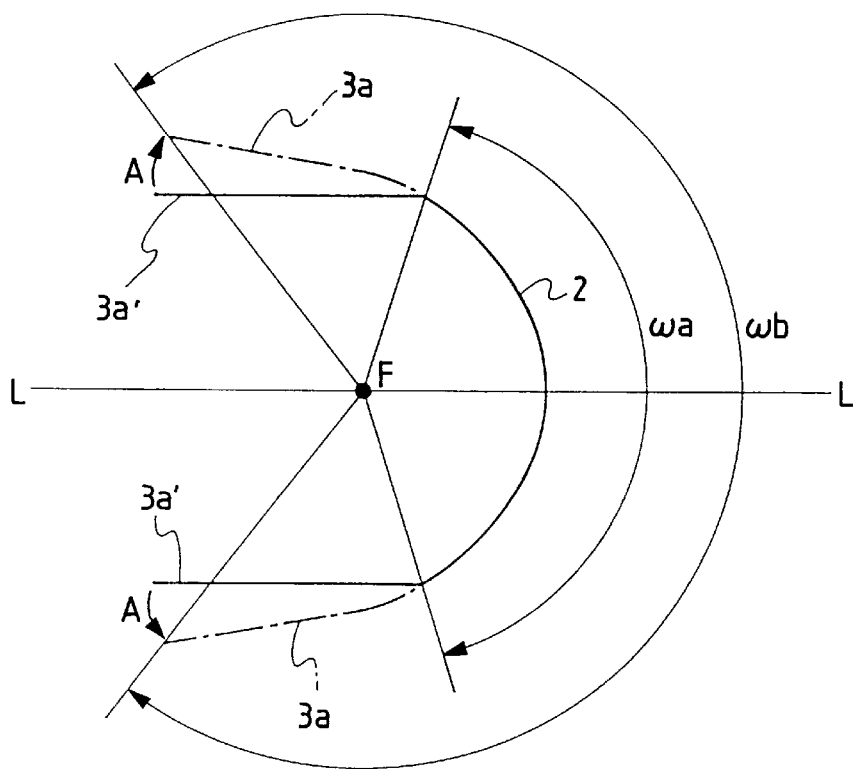
FIG. 3 is a diagram illustrative of a method of forming a reflection surface of the invention together with FIGS. 4 to 7.
Figure 4:
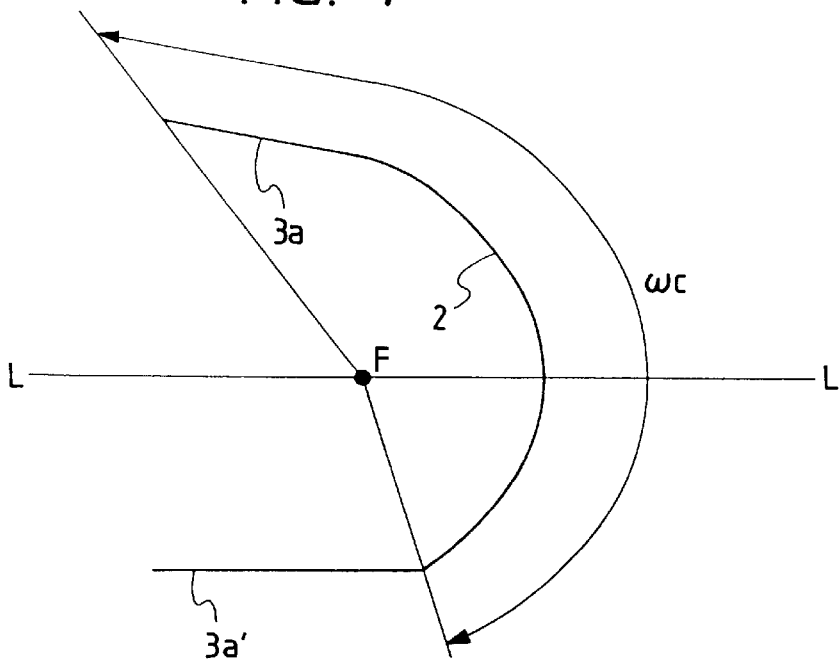
FIG. 4 is a sectional view schematically showing an example in which only one circumferential wall portion is inclined with respect to a main optical axis.

While both the circumferential wall portions 3a, 3a are formed into surfaces inclined with respect to the main optical axis L-L in FIG. 3, only one of the pair of circumferential wall portions 3a, 3a may be formed into a surface inclined with respect to the main optical axis L-L (in this case, it is apparent that the optically controllable area corresponds to a solid angle $\omega c$ that corresponds to the reflection surface of one of the circumferential wall portions 3a and of the main reflection portion 2 with respect to the point F). Further, the above fact can, of course, be applied similarly to the left and right circumferential wall portions 3b, 3b.

Then, as shown in FIG. 5, a group of curved surfaces that defines the performance of the reflection surface must be prepared. The group of curved surfaces 7 includes a number of paraboloids of revolution 7a, 7a, . . . that have a common axis of symmetry of revolution and whose focal distances are different from one another. These paraboloids of revolution 7a, 7a, . . . are so selected as not to intersect one another spacewise. It may be noted that the focuses of the paraboloids of revolution 7a, 7a, . . . do not always coincide with one another (e.g., the fact that the respective focuses are positioned within a certain range on the axis of symmetry of revolution is acceptable since the actual light source has a certain size).

Intersecting lines 8, 8, . . . between the curved surface 6 and the group of curved surfaces 7 are determined. These intersecting lines 8, 8, . . . form closed curves or part of such closed curves and never intersect one another on the curved surface. It may be noted that the central portion of the group of closed curves is generally located out of an intersecting point between the main optical axis of the reflection mirror 1 and the curved surface since the central portion of the group of closed curves is determined by the position of a point at which one paraboloid of revolution constituting the group of paraboloids of revolution comes in contact with the curved surface 6 if the intersecting lines 8, 8, . . . include the closed curved lines.

Figure 6:
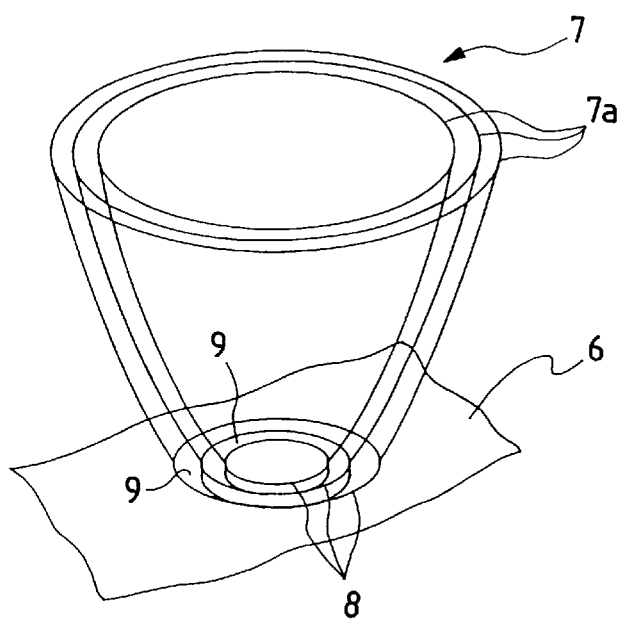
FIG. 6 is a diagram illustrative of how reflection steps are formed.

When the intersecting lines 8, 8, . . . have been determined in this way, the reflecting steps are then formed based on these intersecting lines. That is, as shown in FIG. 6, the reflecting steps 9, 9, . . . are defined by portions of the paraboloids of revolution and disposed between the adjacent intersecting lines.

Figure 7:
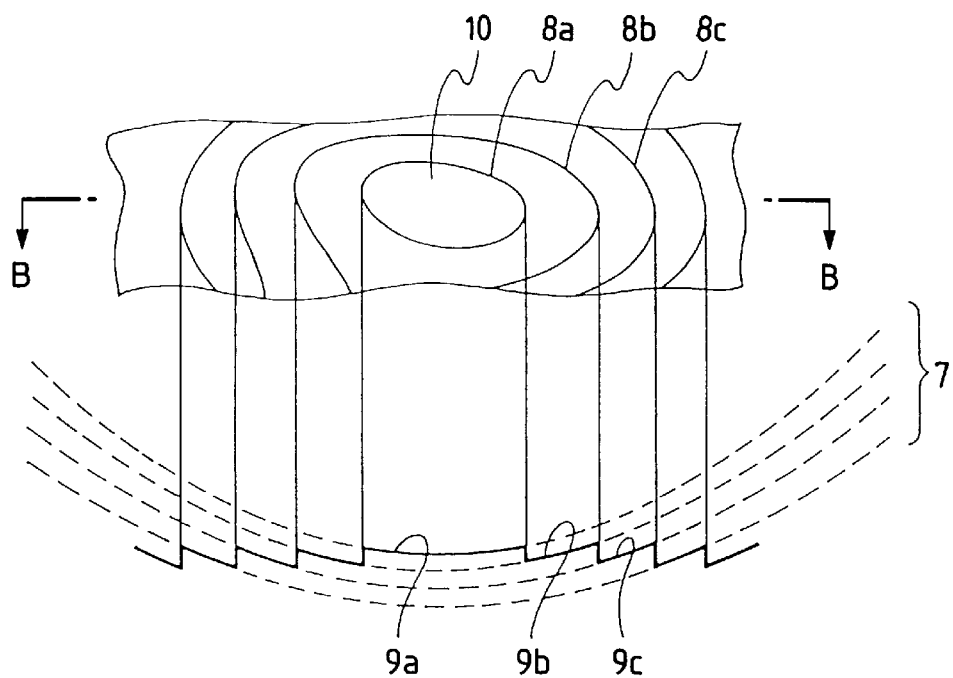
FIG. 7 is a diagram showing the shape of a part of the reflection surface and a cross-sectional form thereof.

FIG. 7 not only shows part of the curved surface 6 on the upper part thereof, but also schematically shows a section taken along line B-B of the curved surface 6 in the lower part thereof. The intersecting lines on the curved surface 6 are denoted by 8a, 8b, 8c, . . . from the position closer to the central portion 10 of the group of closed curves on the curved surface 6, and appear as borderlines between the reflection steps. It may be noted that the broken lines in FIG. 7 show the group of paraboloids of revolution; i.e., the steps are formed in such a manner that a reflection step 9a is formed in an inner region defined by the intersecting line 8a, that a reflection step 9b is formed in an inner region between the intersecting lines 8a and 8b, and that a reflection step 9c is formed in an inner region between the intersecting lines 8b and 8c. That is, the effective reflection surfaces of the individual reflecting steps are formed so as to be part of paraboloids of revolution whose focal distances are different from one another. Such effective reflection surfaces are shaped steplike as viewed in cross-sectional form.

Once a reflection surface having the thus formed reflection steps and a reflection mirror 1 having such reflection surface have been prepared by means of CAD, CAM (Computer Aided Manufacturing) data can be obtained in order to prepare a mold for the reflection mirror 1 based on the CAD data.

According to the reflection mirror 1, rays of light whose reflecting directions are controlled by formation of many reflection steps 9, 9, . . . on the reflection surface including the reflection surface of the main reflection portion 2 and of the circumferential wall portion 3, can be utilized as rays of light effective for luminous intensity distribution (e.g., if the focuses of the group of paraboloids of revolution are common and if a point light source is placed on such common focus, rays of light emitted from the point light source and reflected by arbitrary reflection steps become parallel rays of light with respect to the common axis of the group of paraboloids of revolution). Therefore, without interposing an optically controlling lens member between the outer lens and the reflection mirror or the reflection portion, and by connecting the inner surface of the circumferential wall portion 3 inclined with respect to the main optical axis L-L to the inner surface of the main reflection portion 2 smoothly, many reflecting steps divided by borderlines that are looplike or that form part of loops can be formed without forming a significant uneven portion at a border between the main reflection portion 2 and the circumferential wall portion 3.

FIGS. 8 to 11 show an embodiment in which the invention is applied to the reflection mirror of a rear combination lamp of a vehicle.

Figure 8:
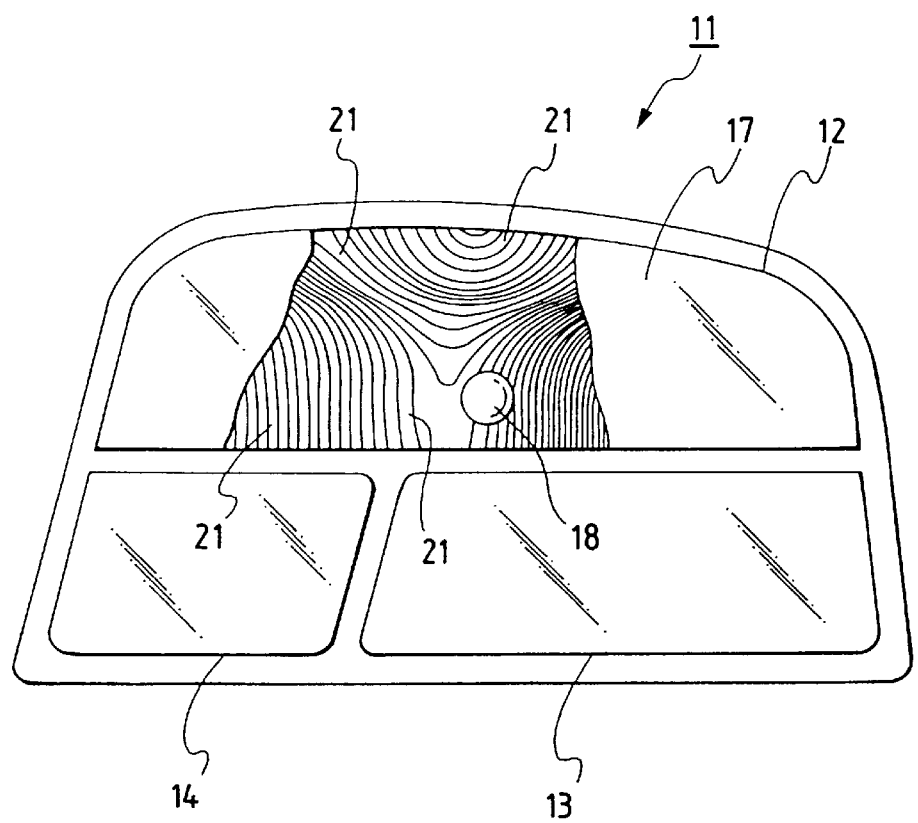
FIG. 8 is a diagram showing an embodiment of the invention together with FIGS. 9 to 11.

As shown in FIG. 8, a vehicle lamp 11 includes a tail and stop lamp portion 12 that takes up the upper half as viewed from the front, and a turn signal lamp portion 13 and a back lamp portion 14 which are located on the lower half. The aforementioned reflection mirror 1 is applied to a reflection mirror that constitutes the tail and stop lamp portion 12.

Figure 9:
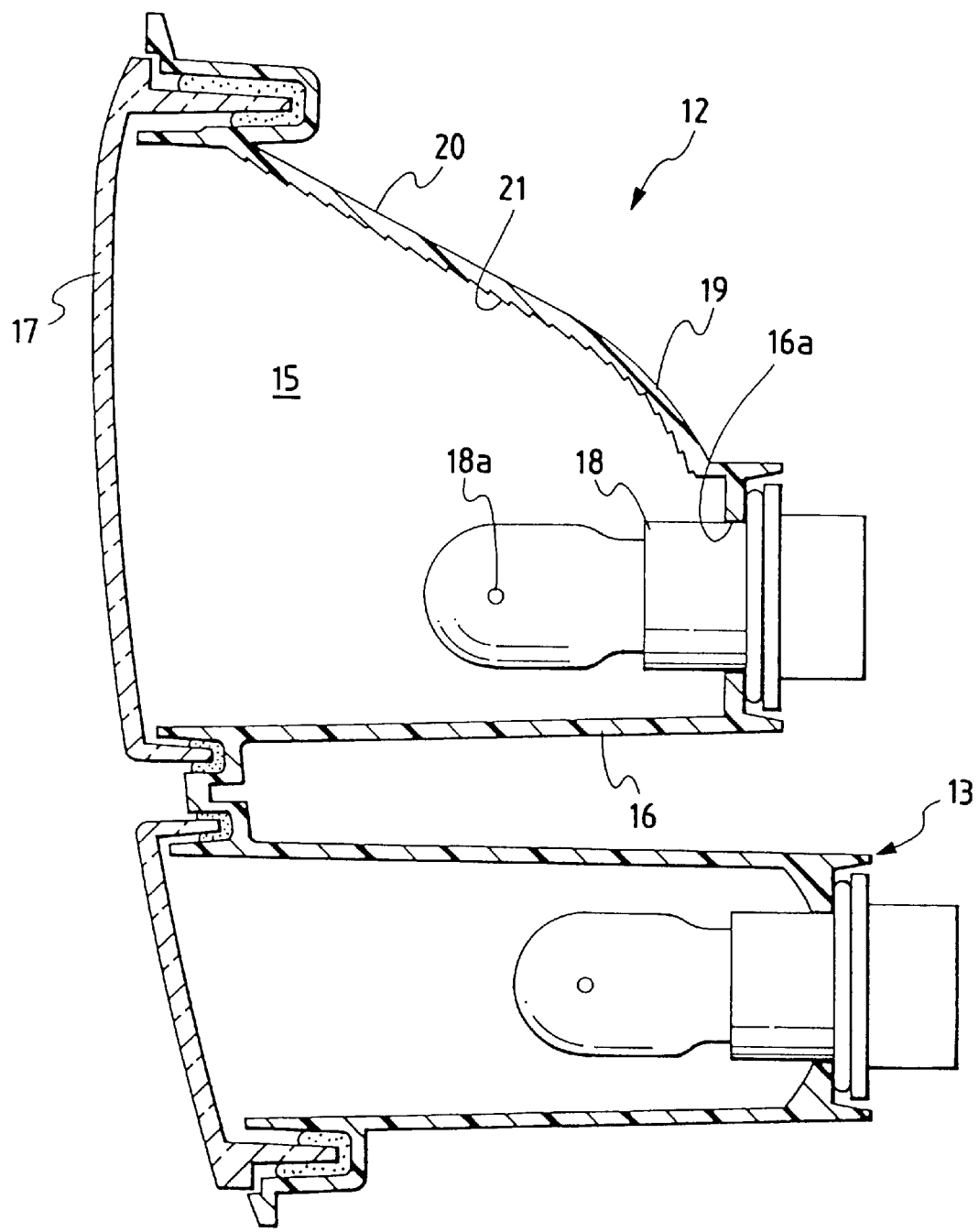
FIG. 9 is an enlarged vertical sectional view of a main portion.
Figure 10:
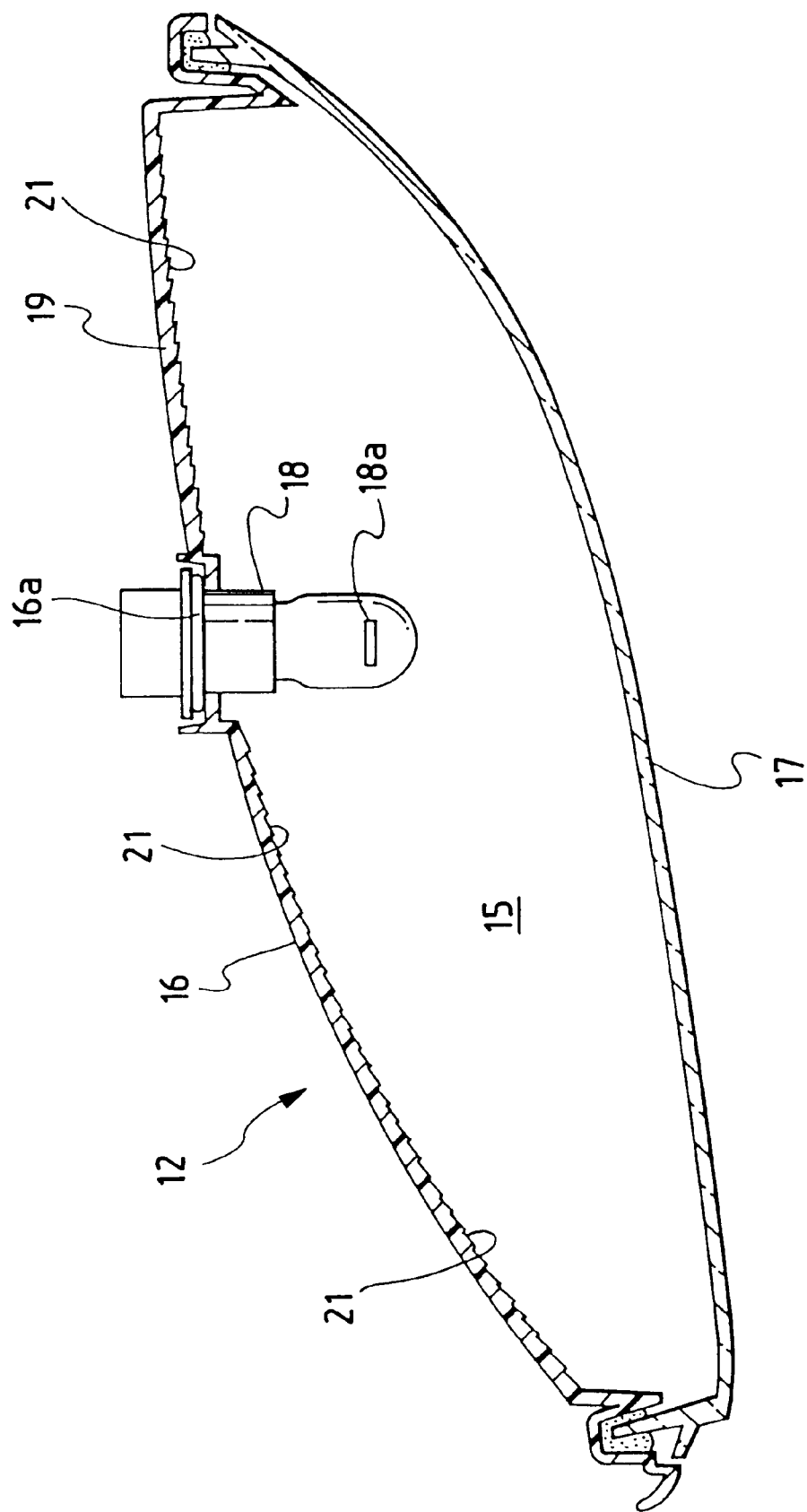
FIG. 10 is an enlarged horizontal sectional view of a main portion.

As shown in FIGS. 9 and 10, a lamp space 15 of the tail and stop portion 12 is defined by a lamp body 16 and an outer lens 17. The lamp body 16 has one end thereof opened and is made of a synthetic resin. The outer lens 17 is disposed in front (being in the direction of light irradiation from the lamp) of the lamp body 16 to cover the opening of the lamp body 16. The reflection mirror is prepared by applying a reflecting treatment (reflection coating, aluminum vapor deposition, etc.) to the inner surface of the lamp body 16. It may be noted that although not shown in the drawings, the outer lens 17 is partitioned so as to be substantially latticelike and many lens steps (fisheye lens steps, cylindrical lens steps, etc.) are formed.

An electric bulb insertion hole 16a is formed in the rear end portion of the lamp body 16. This hole 16a serves to place an electric bulb 18 inside the lamp space 15. The electric bulb 18 is designed to be releasably attached to the rear end of the lamp body 16 by a not shown means with the central axis of a filament 18a of the electric bulb 18 extending in a horizontal direction so as to be orthogonal to the main optical axis of the vehicle lamp 11.

In this embodiment, a portion 19 of the lamp body 16 which is around the electric bulb insertion hole 16a is the main reflection portion equivalent to the aforementioned main reflection portion 2, and an upper circumferential wall portion 20 out of the upper, lower, left, and right circumferential wall portions extends obliquely upward toward the front so as to be smoothly continuous from the main reflection portion 2 with the other circumferential wall portions being flat and parallel with the main optical axis of the vehicle lamp 11.

Figure 11:
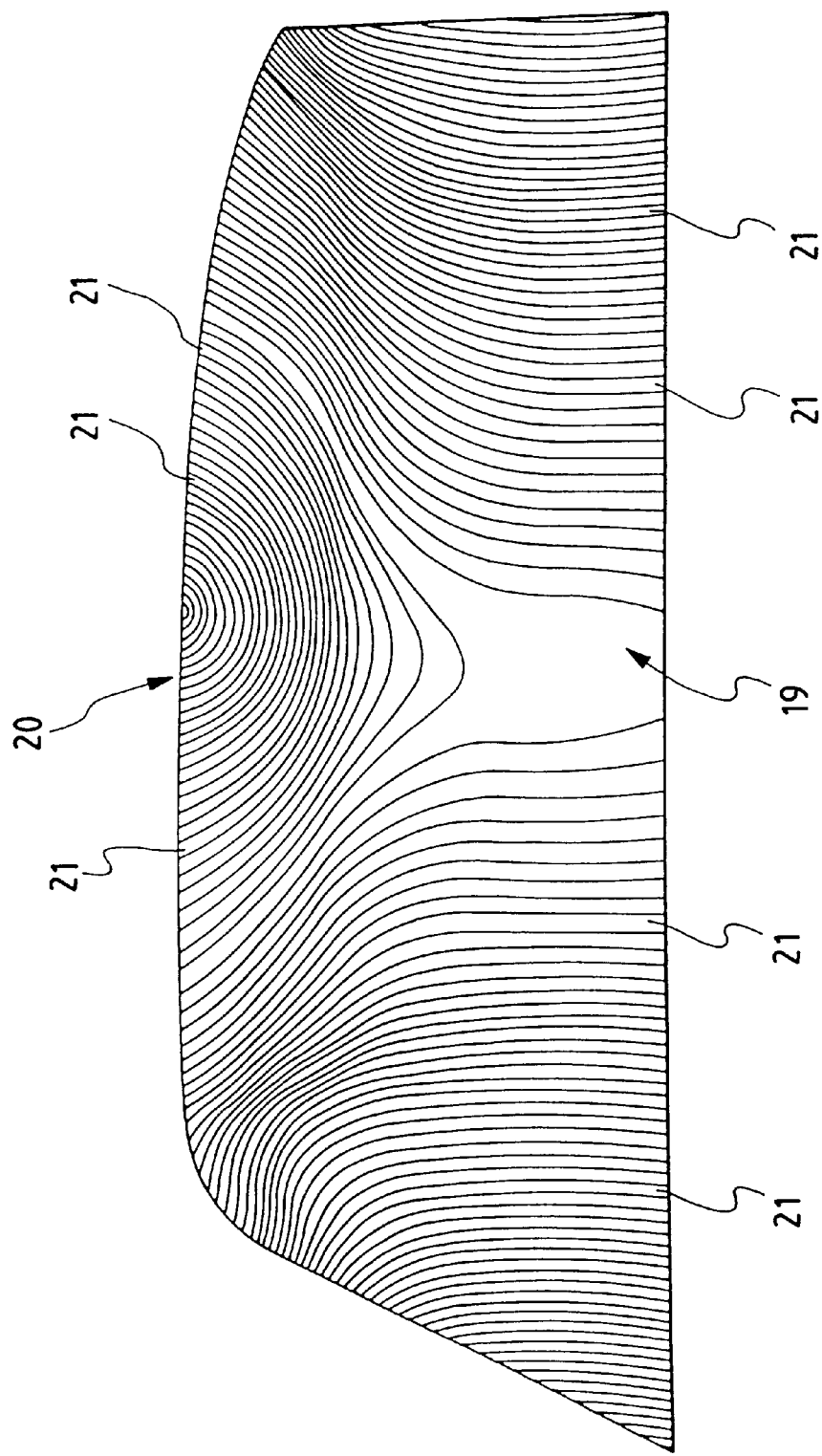
FIG. 11 is a front view showing the reflection surface.

Many reflection steps 21, 21, . . . are formed on the inner surface of the main reflection portion 19 and the circumferential wall portion 20. As shown in FIG. 11, the borderlines of the reflection steps 21, 21, . . . extending from top as well as from both left and right sides on the inner surface of the lamp body 16 are formed so as to depict such a distribution as to meet substantially at the middle portion of the main reflection portion 19. It is observed that the distance between the adjacent borderlines becomes wider at the middle portion of the main reflection portion 19 and narrower in portions close to the upper as well as both left and right circumferential wall portions. It may be noted that the electric bulb insertion hole 16a is omitted in FIG. 11.

If the front edge portion of the upper circumferential wall portion 20 is supposed to be extended further obliquely upward toward the front in this embodiment, the central portion of the group of closed curves defining the borderlines of the reflection steps 21, 21, . . . will be positioned on the inner surface of such extended portion of the upper circumferential wall portion 20. Therefore, the central portion is virtual in the sense that the central portion does not actually appear on the inner surface of the lamp body 16 (that is, the central portion of the group of closed curves does appear when the upper circumferential wall portion 20 is actually extended). Further, while the case where the number of central portions of the group of closed curves is set to one has been described in this embodiment, the number of central portions of the group of closed curves may be two or more, depending on the shape of the fundamental surface of the reflection surface.

As shown in FIG. 9, the lamp space of the turn signal lamp portion 13 that constitutes the vehicle lamp 11 is defined by a reflection portion (that has, e.g., a reflection surface such as a paraboloid of revolution) formed as part of the lamp body and an outer lens that is arranged ahead of the reflection portion. No lens member is interposed between an electric bulb arranged inside the lamp space and the outer lens. In addition, this fact applies similarly to the back lamp portion 14. Therefore, the sense of depth of the three lamp portions 12 to 14 (i.e., sense of seeing with respect to the nominal depth when one looks into the main reflection portion of each lamp portion through the outer lens) can be unified.

As is apparent from the foregoing, according to the present invention, the inner surfaces of the circumferential wall portions are inclined with respect to the main optical axis of the reflection mirror and the inner surfaces are made smoothly continuous to an inner surface of the main reflection portion to form a fundamental surface of a reflection surface, and many reflection steps are formed on the inner surface of the main reflection portion and of the circumferential wall portions, the reflection steps being defined by portions of respective paraboloids of revolution and disposed between adjacent ones of closed curves formed as intersecting lines between a group of the paraboloids of revolution with different focal distances and the fundamental surface of the reflection surface or disposed between adjacent ones of curves which are parts of the closed curves. Therefore, rays of light whose reflecting directions are controlled by the reflection steps formed on the inner surface of the circumferential wall portion can be obtained, so that such rays can be utilized as effective rays of light for luminous intensity distribution.

The reflection step forming method of the invention requires only the formation of many reflection steps on the fundamental surface without dividing the fundamental surface of the reflection mirror into a plurality of reflection regions whose luminous intensity distributing characteristics are different from one another. Therefore, there is no remarkable uneven portion formed on the borders between the reflection regions. Further, there is no need for interposing an inner lens between the reflection mirror and the outer lens. As a result, not only glare caused by a remarkable uneven portion can be reduced, but also the cost of manufacture can be curtailed.

What is claimed is:
1. A reflection mirror for a vehicle lamp, comprising:
a main reflection portion having an inner surface and including a region close to an intersecting point between a main optical axis of said reflection mirror and said reflection mirror; and
a circumferential wall portion extending from said main reflection portion;
wherein at least a part of said circumferential wall portion is inclined with respect to the main optical axis of said reflection mirror and an inner surface of said part of said circumferential wall portion forms a fundamental surface of a reflection surface; and
wherein a plurality of reflection steps are disposed on the inner surface of said main reflection portion and of said circumferential wall portion, said reflection steps being defined by portions of respective paraboloids of revolution and disposed between adjacent ones of closed ones of closed curves formed as intersecting lines between a group of the paraboloids of revolution with different focal distances and the fundamental surface of the reflection surface of disposed between adjacent ones of curves which are parts of the closed curves.

2. A reflection mirror for a vehicle lamp as recited in claim 1 wherein said inner surface of said part of said circumferential wall portion is smoothly continuous to the inner surface of said main reflection portion.

3. A reflection mirror for a vehicle lamp as recited in claim 1 wherein all of said circumferential wall portion is in inclined with respect to the main optical axis of said reflection mirror and is smoothly continuous to the inner surface of said main reflection portion.

4. A reflection mirror for a vehicle lamp as recited in claim 1 wherein said inner surface of the main reflection portion is a free curved surface.

5. A reflection mirror for a vehicle lamp as recited in claim 1 wherein said at least a part of said circumferential wall portion comprises one of a flat or curved surface.

6. A reflection mirror for a vehicle lamp as recited in claim 1 wherein said inner surface of said at least a part of said circumferential wall portion and said inner surface of said main reflection portion are connected in the form of an nth order continuum where $n \geq 1$.

7. A reflection mirror for a vehicle lamp as set forth in claim 1 wherein said group of paraboloids of revolution have a common axis of symmetry and a common focal point.

8. A reflection mirror for a vehicle lamp as recited in claim 1 wherein said group of paraboloids of revolution have a common axis of symmetry and at least one of said paraboloids has a focus which is not coincident with a focus of another one of said paraboloids.

9. A refection mirror for a vehicle lamp as set forth in claim 1 wherein a center of loops are on the circumferential wall portion.

10. A vehicle lamp comprising a lamp body, a reflection mirror having a main reflection portion, at least one of a tail and stop portion and an outer lens disposed in front of said lamp body to cover an opening of the lamp body, said reflection mirror further comprising a circumferential wall portion extending from said main reflection portion;
wherein at least a part of said circumferential wall portion is inclined with respect to a main optical axis of said reflection mirror and an inner surface of said part of said circumferential wall portion is smoothly continuous to an inner surface of said main reflection portion to form a fundamental surface of a reflection surface;

and wherein a plurality of reflection steps are disposed on an inner surface of said main reflection portion and of said circumferential wall portion, said reflection steps being defined by portions of respected paraboloids of revolution and disposed between adjacent ones of closed curves formed as intersecting lines between a group of the paraboloids of revolution with different focal distances and the fundamental surface of the reflection surface are disposed between adjacent ones of curves which are parts of the closed curves.

11. A vehicle lamp as recited in claim 10 further comprising a plurality of said circumferential wall portions.

12. A vehicle lamp as recited in claim 11 wherein each of said circumferential wall portions has its plurality of reflection steps defined by a different axis of revolution.

13. A vehicle lamp as recited in claim 10 wherein said outer lens is partitioned so as to appear to an observer as substantially latticelike with a plurality of lens steps formed therein.

* * * * *